(12) United States Patent
Degidi

(10) Patent No.: US 10,610,337 B2
(45) Date of Patent: Apr. 7, 2020

(54) DENTAL PROSTHESIS AND METHOD FOR THE PRODUCTION THEREOF

(71) Applicant: Dentsply Implants Manufacturing GmbH, Mannheim (DE)

(72) Inventor: Marco Degidi, Bologna (IT)

(73) Assignee: Dentsply Implants Manufacturing GmbH, Mannheim (DE)

( * ) Notice: Subject to any disclaimer, the term of this patent is extended or adjusted under 35 U.S.C. 154(b) by 0 days.

(21) Appl. No.: 14/349,826

(22) PCT Filed: Oct. 25, 2012

(86) PCT No.: PCT/EP2012/004463
§ 371 (c)(1),
(2) Date: Apr. 4, 2014

(87) PCT Pub. No.: WO2013/060458
PCT Pub. Date: May 2, 2013

(65) Prior Publication Data
US 2014/0242550 A1     Aug. 28, 2014

(30) Foreign Application Priority Data

Oct. 27, 2011  (DE) .................. 10 2011 117 035

(51) Int. Cl.
*A61C 13/20* (2006.01)
*A61C 8/00* (2006.01)

(52) U.S. Cl.
CPC ............... *A61C 13/20* (2013.01); *A61C 8/005* (2013.01); *A61C 8/0048* (2013.01); *A61C 8/0078* (2013.01)

(58) Field of Classification Search
CPC ..... A61C 8/005; A61C 8/0048; A61C 8/0054; A61C 5/10; A61C 5/08; A61C 5/007; A61C 13/20; A61C 13/08; A61C 13/083
(Continued)

(56) References Cited

U.S. PATENT DOCUMENTS 3,514,858 A     6/1970 Silverman
4,158,256 A  *  6/1979 Wiland ................ A61C 5/10
                                                     433/219
(Continued)

FOREIGN PATENT DOCUMENTS

EP        1 086 662     3/2001
EP        1 212 985     6/2002
WO        WO-00/27556   5/2000

OTHER PUBLICATIONS

Gehrke et al., "Intra-oral welding of temporary implant abutments with a pre-fabricated titanium bar", implants 3.2005, Jan. 1, 2005, XP055050942.*

(Continued)

*Primary Examiner* — Matthew M Nelson
(74) *Attorney, Agent, or Firm* — Norris McLaughlin, P.A.

(57) ABSTRACT

A dental prosthesis, includes a metal framework having at least one cap, which can be joined to an abutment of a dental implant. The metal framework includes a connecting element which can be, or is, joined to the cap in the oral cavity of a patient, in particular by way of welding, soldering or gluing, wherein the cap has a tip and, on the inside, a cavity into which the abutment can be inserted through an opening located opposite the tip. It is the object to refine the dental prosthesis and/or the metal framework so as to allow improved handling and/or facilitated creation of the, in particular intra-oral, preferably welded, joint with low design complexity. This object is attained by providing a pin arranged as an axial extension in the region of the tip of the cap and the connecting element is joined to the pin.

4 Claims, 3 Drawing Sheets

(58) Field of Classification Search
USPC ... 433/18, 172–176, 191–195, 215, 218–223
See application file for complete search history.

(56) References Cited

U.S. PATENT DOCUMENTS

| | | | | |
|---|---|---|---|---|
| 4,231,740 | A * | 11/1980 | Shoher | A61C 5/08 433/208 |
| 4,433,960 | A * | 2/1984 | Garito | A61C 7/00 433/180 |
| 4,704,089 | A * | 11/1987 | Shoher | A61C 13/275 433/183 |
| 4,711,631 | A * | 12/1987 | Thomsen | A61C 13/225 433/181 |
| 4,820,157 | A * | 4/1989 | Salvo | A61C 5/007 433/180 |
| 5,033,962 | A | 7/1991 | Scatena | |
| 5,897,320 | A * | 4/1999 | Gittleman | A61C 3/16 433/172 |
| 6,056,547 | A * | 5/2000 | Names | A61C 8/0001 433/173 |
| 6,116,070 | A | 9/2000 | Oshida et al. | |
| 6,283,753 | B1 * | 9/2001 | Willoughby | A61C 8/0001 433/172 |
| 6,283,755 | B1 * | 9/2001 | Bergstrom | A61C 8/0048 433/193 |
| 6,749,430 | B2 | 6/2004 | Arturo | |
| 2002/0142265 | A1 * | 10/2002 | Weissman | A61C 8/0022 433/173 |
| 2002/0177106 | A1 | 11/2002 | May et al. | |
| 2007/0031793 | A1 * | 2/2007 | Casement | A61C 8/0048 433/218 |
| 2007/0055254 | A1 * | 3/2007 | Ihde | A61C 8/0018 606/71 |
| 2008/0131846 | A1 * | 6/2008 | Marshall | A61C 5/10 433/218 |
| 2008/0171307 | A1 * | 7/2008 | Wilcox | A61C 8/0048 433/222.1 |
| 2010/0112520 | A1 * | 5/2010 | Worthington | A61C 8/0001 433/169 |
| 2010/0151420 | A1 * | 6/2010 | Ranck | A61C 8/0001 433/173 |
| 2011/0053114 | A1 * | 3/2011 | Shimoda | A61C 7/36 433/173 |
| 2011/0207083 | A1 * | 8/2011 | Boehm-Van Diggelen | A61C 8/001 433/173 |
| 2012/0028221 | A1 * | 2/2012 | Williams | A61C 5/007 433/215 |
| 2012/0073804 | A1 * | 3/2012 | Harman | E21B 43/128 166/250.01 |
| 2012/0082956 | A1 * | 4/2012 | Sakamoto | A61C 8/005 433/173 |
| 2012/0189985 | A1 * | 7/2012 | Iglesias | A61C 8/0048 433/174 |
| 2012/0225397 | A1 * | 9/2012 | Haikel | A61C 7/02 433/3 |

OTHER PUBLICATIONS

Peter Gehrke, et al.; "Intra-oral welding of temporary implant abutments with a pre-fabricated titanium bar", Implants 3-2005, Jan. 1, 2005, XP05505942, URL:http://www.dentistaitaliano.it/documents/Implants_3.2005-Gehrke.Degidi.Spanel.Dhom.Piatelli.pdf.

Marco Degidi, et al. "Prospective study with a 2-year follow-up on immediate implant loading int he edentulous mandible with a definitive restoration using intra-oral welding"; Clinical Oral Implants Research 21, 2010; 379-385.

* cited by examiner

DENTAL PROSTHESIS AND METHOD FOR THE PRODUCTION THEREOF

BACKGROUND OF THE INVENTION

The invention relates to a dental prosthesis, comprising a metal framework and to a method for the production thereof.

Such a dental prosthesis and the method for producing the dental prosthesis are described in issue 3_2005 of the magazine "implants" in the report "intra-oral welding of temporary implant abutments with a pre-fabricated titanium bar." The dental prosthesis comprises a metal framework, which is made in particular of titanium, or a titanium alloy, and comprises one or more caps and a connecting element in the form of a wire or a bar. The caps and the connecting element are joined by way of electric welding, wherein the connecting regions are located at the outer surfaces of the caps, which in particular face the tongue. The cap includes, or the caps include, a cavity on the inside, and are designed to be open at the end facing away from an implant. After dental implants have been implanted into a jaw, the caps are placed onto abutments of the dental implants, and thereafter the welded joint with the connecting element is created in the oral cavity, or intra-orally. Two electrodes, which are connected to a welding device and which, in particular, form an integral part of pincers, are applied such that the one electrode is seated against the outer surface of the connecting element, and the other electrode is seated against the opposite side of the cap, and they are pressed on with predefined pressing pressure for carrying out the welding operation. As a result of the relatively large distance between the outer surface of the connecting element and the aforementioned opposing outer surface of the cap, the electrodes and/or the aforementioned pincers have an accordingly large size, whereby handling poses difficulties, considering the space constraints in the oral cavity.

SUMMARY OF THE INVENTION

Proceeding from this, it is the object of the invention to refine the dental prosthesis and/or the metal framework so as to allow improved handling and/or facilitated creation of the, in particular intra-oral, welded joints with low design complexity. Both the work involved and the size of the device that is required to implement the welded joint, the device being designed particularly as pincers and comprising, in particular, the aforementioned electrodes, are to be reduced.

Moreover, a cap is to be provided, which allows simple handling and/or unproblematic creation of the joint with the connecting element. Moreover, the forces and torque acting on the cap, and ultimately on the metal implant, both during creation of the welded joint and throughout the usage duration of the dental prosthesis, are to be reduced.

The features of the invention include the cap, the method for producing a dental prosthesis, and use of the dental prosthesis.

The dental prosthesis according to the invention and/or the metal framework thereof are characterized by a simple, and nonetheless functionally adequate, design, wherein the dentist can easily grab the pin designed as an axial extension of the cap using his fingers, and the cap can be placed without difficulty on the associated abutment of the dental implant implanted into the jaw. The dental prosthesis is a prosthetic restoration that is easy to produce and/or has high stability, and that is designed as an implant, bridge or individual tooth restoration. The pin is an integral part of the cap and has a considerably smaller outer diameter than the cap has at the region thereof facing away from the dental implant. Positioning and fixation of the connecting element close to the axis are thus achieved, whereby reduction of the lever action on the dental implant and/or of the acting forces or torque is advantageously achieved. Due to the reduced diameter of the pin, the device that comprises the welding electrodes, and preferably is designed as pincers, can be designed for a considerably reduced electrode distance, and can have have an accordingly smaller size and/or lower weight, whereby handling is facilitated. The inside space of the cap is designed to be closed at the end thereof facing away from the dental implant, in particular by way of a ceiling, wherein the ceiling and the pin connected thereto, preferably integral therewith, are integral parts of the cap. Preferably, the cap has, or the caps have, conical inner surfaces, corresponding to the conical outer surfaces of the abutments. The inner geometry of the cap comprising the pin is adapted to the geometry of the abutment of the respective implant system. The dental prosthesis and/or the metal framework can thus be used in a simple manner by designing the inner geometry of the cap to correspond to the outer geometry of the abutments of different implant systems. The cap is, or the caps are, prefabricated and/or standard components to which the connecting element, which preferably is designed as a wire or bar made of metal, is welded inside the patient's mouth. The dentist thus produces a stable metal framework directly in the oral cavity of a patient, which is preferably potted into a prepared prosthesis, in particular in the shape of a shell, in a dental laboratory. Within the scope of the invention, the material of the prosthesis is preferably cured after insertion of the prosthesis into the oral cavity, wherein the caps that are connected to each other according to the invention are, and/or have been, placed onto the respective associated abutments. Preparation of a dental cast so as to capture the position and orientation of the dental implants or the abutments thereof, and subsequent production, in particular by way of casting, of the caps of the metal framework in the dental laboratory are dispensed with. Advantageously, considerably higher precision is achieved.

Moreover, improved retention is achieved due to an isodrome orientation or equal alignment of the cap or caps of at least approximately and/or essentially 3.5° to 6.5°, in particular 4° up to/or 5.5°, i.e., 4° to 5.5° is preferred and 5.5° is most preferred. According to the invention, the apex angle of the preferably conical inner surface of the cap or caps, or of the inner geometry thereof, is predetermined to be twice as large as the aforementioned angular degrees. Such retention is particularly advantageous and/or optimizes the stability of the prosthodontic product or of the dental prosthesis, which is designed, in particular, as an implant, bridge or individual tooth restoration. Moreover, in the case of a rigid connection, and more particularly a cemented connection, the stability of the implant-borne dental restoration or of the dental prosthesis is improved. Furthermore, the dimension of the prosthetic element or system, or of the dental prosthesis, comprising the abutment and the cap or caps, is reduced according to the invention, whereby a larger space is preferably achieved for the peri-implant connection and/or the ingrowth of epithelial and bone tissue in terms of the biological width of the peri-implant. The dental prosthesis according to the invention is designed both for immediate loading, in particular in the case of newly inserted dental implants, and for a subsequent restoration following a partial healing phase of the dental implant or implants.

While the connection of the cap to the connecting element in the form of a welded joint has proven to be particularly advantageous, within the scope of the invention, another joining technique, such as in particular bonding or soldering, may be provided as an alternative. In order to create the joint, an appropriately designed handheld device is used, by way of which the necessary pressing pressure, such as for bonding, of the connecting element is applied onto the pin and/or by way of which the thermal energy for curing of the adhesive is applied. For a solder connection, the handheld device is designed so that the connecting element is brought into a reliably seated position against the pin and, additionally, the solder or soldering flux is heated and/or melted as needed. The measures and advantages described with respect to the welded joint apply analogously to the respective joining techniques, wherein at this point in particular the ease of handling shall be pointed out, as well as the pin that is provided according to the invention, which the dentist can reliably grab using his fingers so as to place the cap without difficulty onto the abutment.

Specific embodiments and refinements of the invention are described in the dependent claims, the drawings and the description.

The invention will be described in more detail hereafter based on the exemplary embodiments shown in the drawings, without thereby limiting the invention in this respect. In the schematic illustrations:

DETAILED DESCRIPTION OF THE INVENTION

Figure 1:
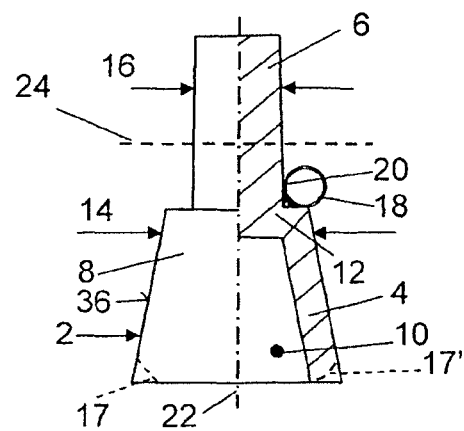
FIG. 1 shows in part a lateral view and a partial axial sectional view through the cap having a welded-on rigid metal wire.

According to FIG. 1, the cap 2 comprises a conical jacket 4 and a pin 6 as an axial extension, the pin being disposed in the region of the tip 8 of the conical jacket 4. The cap 2 has a cavity 10 on the inside in such a way that the cap can be placed in the known manner onto an abutment of a dental implant, which is not shown in further detail here, and can be joined to the abutment. In the region of the tip 8, the cap 2 has a roof 12, by way of which the pin 6 is connected to the cap 2, preferably in one piece. In this embodiment, the pin 6 essentially adjoins the tip region of the jacket 4, or of the cap 2, at a right angle. This embodiment is easy to produce.

In the region of the tip 8, the cap 2, or the jacket 4 thereof, has a diameter 14 that is larger, by a predefined factor, than the diameter 16 of the pin 6. The cap 2 designed integrally together with the pin 6 is made of metal, and more particularly titanium or a titanium alloy. At the other end located opposite the pin 6, the cap 2 preferably also has a chamfer 17, which preferably extends over the circumference and allows optimized engraftment and/or attachment of the mucous membrane. As an alternative to the chamfer 17, a concave or convex rounded region 17 may be provided within the scope of the invention, which likewise extends over the circumference.

A connecting element 18, which preferably is designed as a wire, bar or rod, is connected to the pin 6, in particular by way of welding, as is indicated in FIG. 1 by the area 20 highlighted in black. The connecting element 18 is advantageously likewise made of titanium or a titanium alloy. Since the connecting element 18 is connected to the pin 6, which has a considerably smaller diameter 16 than the diameter 14 of the outer surface 36 of the jacket 4 of the cap 2, and is thus located at a relatively small distance from the longitudinal axis 22, the leverage on the dental implant, or the torque, is considerably lower as compared to connection at the outer surface 36 of the jacket 4. The diameter 16 expediently ranges between 1 and 2.5 millimeters, and advantageously it is 1.5 to 2 millimeters. The axial length of the pin 6 preferably ranges between 2 and 15 millimeters, and advantageously between 4 and 10 millimeters. The connection to at least one further cap of the metal framework of the dental prosthesis takes place analogously by way of the connecting element 18.

So as to produce the metal framework, initially the cap 2 and the further cap, or further caps, are placed onto abutments of associated dental implants that are already implanted into a jaw. It is of particular importance that the dentist can grab the pin manually, or use his fingers, and can thus place the cap 2 onto the abutment without difficulty. Thereafter, the connecting element 18 is shaped accordingly and placed against the pins of the respective caps. Then, the connections between the connecting element 18 and the pins 6 in the oral cavity are created, and more particularly preferably by way of intra-oral welding. The connection is advantageously created by way of an electric welding method, wherein one electrode is placed against the connecting element 18 and the other electrode is placed against the pin 6. The aforementioned electrodes are advantageously part of a handheld device, in particular pincers, which is connected to an electric welding device in the known manner and by way of which the necessary pressing pressure of the electrodes for welding is applied. Since the electrodes, or the handheld device, or the aforementioned pincers, are to be placed against the comparatively thin pin 6, and not against the outer surface of the jacket 4, the electrodes and/or the handheld device have a relatively small size, whereby handling and implementation of the weld in the oral cavity are considerably facilitated. Moreover, the handheld device is prevented from sliding with high reliability. After the welded joint has been created, the pin 6 is preferably shortened, as is indicated by the dotted line 24. Thereafter, the metal framework produced in the oral cavity is embedded in the known manner in a suitable material, or synthetic material, such as acrylic, in a dental laboratory, and the prosthesis or bridge is completed with crowns. The caps, and thus the dental prosthesis or the prosthetic restoration, are then joined to the associated abutments by way of bonding, screwing, cementing or the like.

Figure 2:
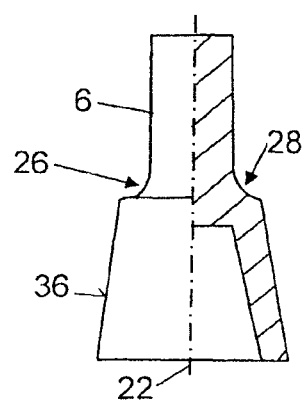
FIGS. 2 to 5 are further embodiments of the cap.

According to FIG. 2, the transition region 26 from the cap 2 to the pin 6 is designed as a flute and/or provided with a rounding 28, which advantageously coincides with the rounding of the connecting element 18, which is not shown in more detail here. In this way, an increased contact region is achieved between the connecting element 18 and the cap and/or the pin 6, and additionally a notch effect is at least reduced. Moreover, high stability is achieved as a result of the increased contact and connecting region. The transition region 26 and/or the flute preferably extend over the entire circumference, relative to the longitudinal axis 22.

Figure 3:
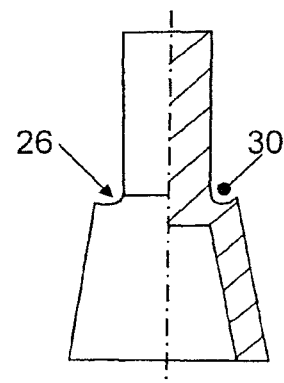

In the embodiment according to FIG. 3, a depression or groove 30, the rounding of which advantageously corresponds to the rounding of the connecting element 18, is provided in the transition region 26. This increases the contact region of the welded joint and improves stability, and the distance of the welded joint from the implant and/or from the jaw bone is also advantageously reduced.

Figure 4:
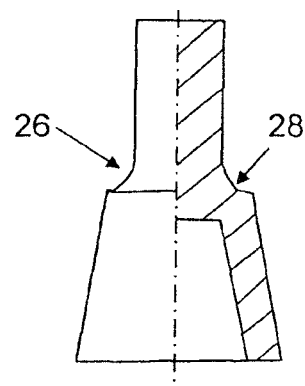

According to FIG. 4, the rounding 28 in the transition region is optimized, in particular with respect to a reduction of the notch effect, whereby high load-bearing capacity and/or stability are further achieved.

Figure 5:
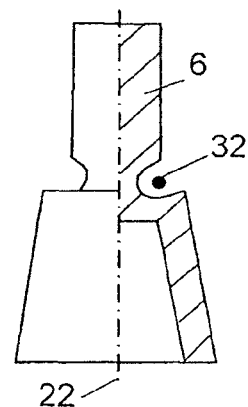

According to the specific embodiment shown in FIG. 5, a depression or groove 32 is provided, which also protrudes into the pin 6, more particularly such that the distance both to the longitudinal axis 22 and to the dental implant or to the jaw bone are advantageously reduced. In this embodiment, the rounding of the depression or of the groove 30 is also adapted to the rounding of the connecting element or of the wire 18, whereby the welding or connecting surface is preferably further increased.

The transition region 26, or the flute, or the depression 30, or the groove 32, extend over the entire circumference, relative to the longitudinal axis 22.

In alternative embodiments, the connecting element 18 has an outer contour that deviates from a cylindrical or circular shape, for example, it has a polygonal or an oval outer contour. The contour or shape of the transition region 26 and/or of the depression 30, or of the groove 32, is appropriately adapted to such outer contours, so that a large connecting region, and more particularly welding region, with the connecting element 18 is present. Such adaptations preferably achieve high stability of the metal framework of the dental prosthesis, or of the prosthetic restoration, with low material and manufacturing complexity and/or with a compact design.

Figure 6:
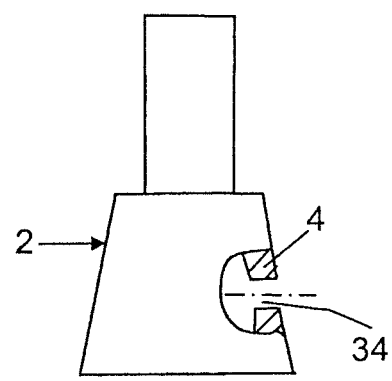
FIGS. 6, 7 show caps having a lateral borehole or lateral retentions.

The exemplary embodiment of the cap 2 shown in FIG. 6 includes a through-hole 34 in the jacket 4. This borehole 34 allows a screw to be screwed in so as to fix the cap 2 on the aforementioned abutment of the dental implant.

Figure 7:
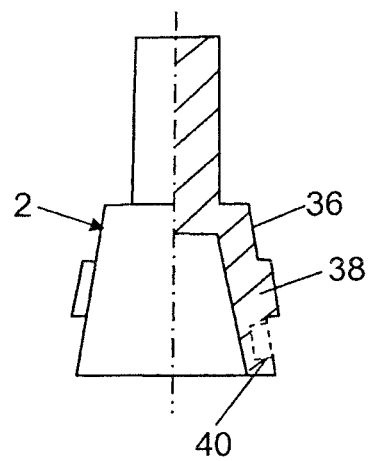
Figure 8:
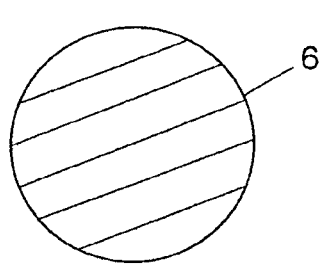
FIGS. 8 to 11 show various cross-sections of the pins.
Figure 9:
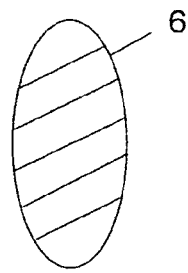
Figure 10:
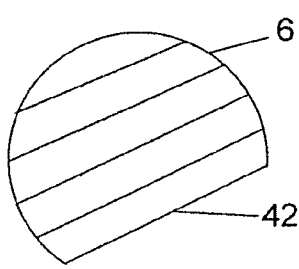
Figure 11:
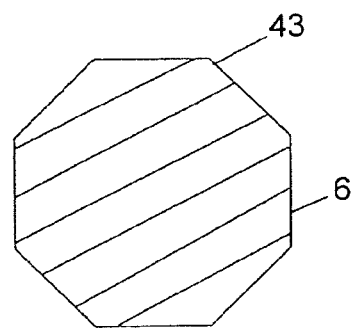

According to FIG. 7, the cap 2 comprises at least one or more retentions 38 that protrude over the outer surface 36. In addition or as an alternative, retentions can be introduced into the outer surface 36, as is indicated by the dotted line. Functionally reliable fixation of the cap in the material of a prosthesis or bridge is achieved by way of such retentions, in particular with respect to rotation.

FIGS. 8 to 11 show different cross-sections of the pin 6. According to FIG. 8, the pin has a rotation-symmetrical design. The pin 6 shown in FIG. 9 has an elliptic cross-section, whereby the distance between the welded joint and the longitudinal axis can preferably be freely predefined, particularly by rotating the cap about the longitudinal axis. According to FIG. 10, the pin 6 has a flattened surface 42, as a result of which the contact region, or the welding surface, of the connecting element is advantageously increased. A polygonal cross-sectional surface having eight corners 44, for example, is provided according to the specific embodiment shown in FIG. 11, but any other number of corners may also be predefined within the scope of the invention.

Figure 12:
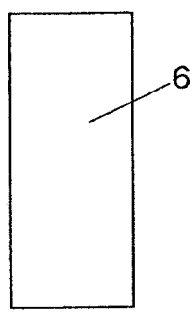
FIGS. 12 to 14 are lateral views of the pin having various cross-sections.
Figure 13:
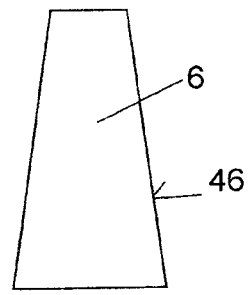
Figure 14:
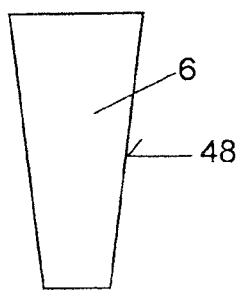

FIGS. 12 to 14 show various side views of the pin 6, and for the sake of simplicity the jacket of the cap adjoining toward the bottom and the above-described transition regions are not shown in the drawing. It shall be pointed out that the different, above-described transition regions can be provided depending on the requirements. The pin 6 shown in FIG. 12 is cylindrical in accordance with the embodiments shown in FIGS. 1 to 7. According to FIG. 13, the outer surface 46 of the pin 6 is conical and tapers away from the transition region, or from the jacket. According to the embodiment shown in FIG. 14, the outer surface 48 tapers in the direction of the transition region.

The invention claimed is:

1. A method of assembling a dental prosthesis, the dental prosthesis comprising:
    a first cap adapted to be joined to an abutment of an implanted dental implant in a first part of an oral cavity of a patient, the first cap extending axially for a first height;
    a second cap at a second part of an oral cavity of a patient; and
    a connecting element of metal that is configured to connect said first cap and said second cap; and
    wherein said first cap comprises:
        a jacket portion;
        a first cavity into which the abutment is received through an opening at a distal end of the jacket portion; and
        a pin portion of solid construction without an internal cavity and extending axially from an external surface of a proximal end of the jacket portion in an axial direction away from said opening and said first cavity;
    wherein the pin portion is coaxial with a longitudinal axis of the jacket portion and extends an axial height at least as long as said first height;
    wherein the pin portion has a diameter smaller than a diameter of a proximal portion of the jacket portion;
    wherein the pin portion is adapted to be engaged in electrical contact with a first electrode of a welding device and the connecting element is adapted to be engaged in electrical contact with a second electrode of the welding device; and
    wherein at the pin portion or at a transition region formed by a portion of the pin portion and a portion of the jacket portion, a groove is present, said groove having a surface contour adapted to a rounding of the connecting element, said groove being where said connecting element is to be connected to said first cap by welding, said groove providing stability to the welded connection joint formed by said groove and said connecting element,
    the method comprising:
        receiving at the pin portion fingers of a dentist by which the first cap is placed onto said abutment of the implanted dental implant;
        connecting the pin portion to the connecting element in the oral cavity by welding after the first cap has been placed onto the abutment of the implanted dental implant, wherein the welding comprises contacting a first electrode of a welding device with the pin and a second electrode of the welding implant with the connecting element.

2. The method according to claim 1, further comprising, after the welding, shortening the pin.

3. A method of assembling a dental prosthesis, the dental prosthesis, comprising:
    a first cap adapted to be joined to an abutment of an implanted dental implant in a first part of an oral cavity of a patient, the first cap extending axially for a first height;
    a second cap at a second part of an oral cavity of a patient; and
    a connecting element of metal that is configured to connect said first cap and said second cap; and
    wherein said first cap comprises:
        a jacket portion having a roof;

a first cavity into which the abutment is received through an opening at a distal end of the jacket portion; and a pin portion of solid construction without an internal cavity and extending in an axial direction way from an external surface of a proximal end of the jacket portion comprising the roof of the jacket portion;

wherein the pin portion is coaxial with a longitudinal axis of the jacket portion and extends an axial height at least as long as said first height; and wherein the pin portion has a diameter smaller than a diameter of a proximal portion of the jacket portion;

the method comprising:

placing the first cap onto said abutment of the implanted dental implant by gripping the pin;

placing the connecting element at a position contacting the pin and the roof of the jacket portion; and connecting the pin portion to the connecting element by welding, wherein the welding comprises contacting a first electrode of a welding device with the pin and a second electrode of the welding device with the connecting element.

4. The method of claim 3, further comprising, after the welding, shortening the pin.

\* \* \* \* \*